Patented Aug. 2, 1932

1,869,834

UNITED STATES PATENT OFFICE

KUNI YOSHIOKA, OF MINAMI KU, OSAKA, JAPAN

METHOD OF PREPARING GOLD COMPOUND OF CYSTINE

No Drawing. Application filed March 12, 1928. Serial No. 261,193.

The present invention relates to a method of preparing gold compound of cystine, characterized by compounding cystine with gold chloride. The object thereof is to prepare easily the medicine effective for gradually destroying the tubercule bacillus by simple means.

The gold compound of cystine of this invention if injected in a consumptive's vein, gradually destroys the tubercule bacillus without any secondary reaction, lowers body temperature, reduces cough and expectoration and increases appetite, thus restoring vigor.

The following is a manner of carrying this invention into practice:—

First, suspend 1 molecular weight, namely 240.26 grams of cystine in water and add 2 molecular weights of normal solution of caustic soda thereto to dissolve cystine as sodium salt. Next, to neutralize the chlorine contained in the gold chloride to be added thereto, add 12 molecular weights of normal solution of caustic soda to the said solution of cystine and pour thereinto 4 molecular weight, viz. 1214.30 grams of gold chloride dissolved in water, slowly stirring it up. Then, transparent reddish brown liquid will be obtained. After leaving it alone for some time to have cystine and gold chloride act upon each other sufficiently, make brownish yellow stringy precipitate by adding alcohol thereto. Filter the mother liquor and wash the precipitate with alcohol until the sodium chloride intermingled with it is removed. Finally, after drying it, pulverize it, and thus gold compound of cystine is obtained.

According to this invention the chemical reaction according to the following formula takes place:—

(1) 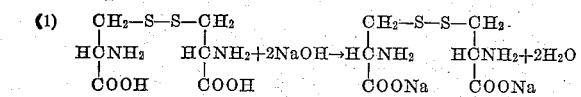

(2) 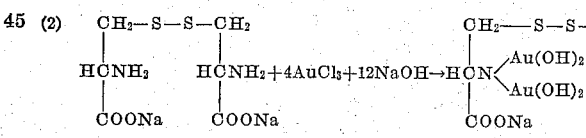

As described above, gold compound of cystine is the stringy precipitate obtained by making 1 molecular weight of cystine and 4 molecular weights of gold chloride act upon each other, and in the mother liquor there remains scarcely any cystine or gold chloride except sodium chloride.

Therefore, for the above reason gold compound of cystine contains all the elements theoretically owned by cystine such as sulphur, carbon, nitrogen, hydrogen and oxygen and also elemental gold contained in gold chloride. As a result of the analysis conducted more than ten times, the inventor has found that each element has the following percentage:—5.98% C, 1.17% H, 2.32% N, 5.32% S, 3.81% Na, 65.47% Au, 15.93% oxygen and losses.

Now, as to the properties of gold compound of cystine, it is a brownish yellow powder which is decomposed at 190° C. It is comparatively difficult to dissolve in water, but is easy to dissolve in weak alkaline water. Although its concentrated solution is transparent and brownish yellow, it presents transparent golden yellow color, if it is diluted. This solution is not only precipitated again by acid, but the dilute solution is easily precipitated by the carbonic acid gas present in the atmosphere and exhaled by man. This fact has indeed an important meaning in using the product of this invention as medicine. Especially, this gold compound of cystine does not dissolve blood-corpuscle. In fact, miscroscopic examination proves that blood-corpuscle undergoes no change whatever from the morphological point of view.

Now, to use it for the treatment of tuberculous diseases, 1 to 5 milligrams of it is converted into weak alkaline solution, which is then injected slowly into the vein once a week or once every ten days. It does not cause any secondary reaction, but sometimes gives more or less fever to the patient not in very weak or serious condition. However, for the patient in the first or second stage of consumption, after the first or a few injections body temperature lowers, cough and expectoration decreases and appetite increases, in consequence of which vigor is restored. By several injections the general condition of the body is improved, the conscious symptom of the illness is reduced and sputum gradually loses purulence and becomes sticky. The tubercule bacillus in the sputum assembles or is destroyed or becomes like streptococcus.

What I claim is:

1. A method of preparing gold compound of cystine, which consists in dissolving cystine in caustic alkali solution, pouring gold chloride solution thereinto, adding alcohol and then collecting the precipitate thus obtained.

2. A method of preparing gold compound of cystine for the treatment of consumption, which consists in dissolving cystine in a dilute solution of caustic soda, pouring a solution of gold chloride thereinto while stirring it up slowly, adding alcohol thereto to obtain brownish yellow stringy precipitate and then washing the precipitate with alcohol, drying and pulverizing it.

3. The method of preparing a gold compound of cystine, which consists in dissolving cystine in a caustic alkali solution, pouring a chloride of gold solution into the same, then causing a precipitate to form therein, and finally collecting the precipitate thus obtained.

KUNI YOSHIOKA.